UNITED STATES PATENT OFFICE.

GUSTAV KARL MAYER, WILLIAM G. ANDREWS, AND ALEX VICTOR COLDBY, OF CHICAGO, ILLINOIS.

BEVERAGE-MAKING MATERIAL AND PROCESS OF PRODUCING THE SAME.

1,391,557.     Specification of Letters Patent.     Patented Sept. 20, 1921.

No Drawing.     Application filed July 14, 1920. Serial No. 396,130.

*To all whom it may concern:*

Be it known that we, GUSTAV KARL MAYER, WILLIAM G. ANDREWS, and ALEX VICTOR COLDBY, citizens of the United States, residing at Chicago, county of Cook, State of Illinois, have invented a certain new and useful Improvement in Beverage-Making Materials and Processes of Producing the Same, and declare the following to be a full, clear, and exact description of the same, such as will enable others skilled in the art to which it pertains to make and use the same.

Since the prohibition against the manufacture and sale in this country of lager beer, many substitutes have been devised in an effort to produce a beverage which shall possess all of the good characteristics of such lager beer with the single exception of those due solely to the presence of the larger amount of alcohol in lager beer. These substitute beverages may be divided into two main classes in one of which the old brewing processes are practised with such variations as will reduce the alcoholic content, while in the other the beverage is made from syrups and the like instead of from malt, corn or other cereals. The first of these classes may again be divided into a sub-class wherein the excess alcohol is removed at the end of the brewing process and another sub-class in which the fermentation is checked during the brewing process so that the alcohol content does not rise above a predetermined limit.

In making lager beer in the old way, a large proportion of the solids are converted into alcohol so that, considering the product only as a beverage, there is an enormous waste in first manufacturing lager beer and then distilling out the excess alcohol. Then, by the distilling operation there is introduced an added item of expense. Possibly a much greater objection than that due simply to the cost of making the beverage is that the beverage itself is a very poor substitute for lager beer, even disregarding the difference in the alcoholic content. This is due to the fact that in the process of distilling out the surplus alcohol, essential oils and other elements are carried away, and the yeast becomes jelly-like and inactive and is largely filtered out of the liquid when the latter is filtered. The resulting beverage is therefore flat and tasteless, its aroma is gone, and when it enters the stomach of the consumer it is inactive, does not aid the processes of digestion, and therefore has the effect of a dead weight in the stomach instead of being exhilarating.

Where the beverage is made in more or less the same way as lager beer except that the process of fermentation is checked, the use of acids or other ingredients to produce a checking action alters the character of the beverage and, since the yeast remains and is always ready to set up fermentation when the conditions are right, the alcoholic content will invariably increase after the beverage has been packaged, due to the fact that packages cannot constantly be kept in refrigerators but will at times be exposed to warm summer temperatures and perhaps to the direct rays of the sun.

The other class of beverages, those made from syrups and the like, bear little resemblance to the beverage for which they purport to be substitutes.

The object of the present invention is to produce a cereal product which may be brewed in the old way and give a beverage having a good body, a rich aroma, which shall not only be palatable but will be exhilarating when it reaches the stomach of the consumer; without the addition of foreign ingredients to check fermentation and without subsequent treatment for removing excess alcohol. In accordance with our invention, the malt, corn or other cereal is simply subjected to heat and moisture in such a manner that it is placed in a condition in which no fermentation can take place or only a predetermined amount of fermentation, which amount may be regulated to give any desired alcoholic content. If the process is carried to a point which will wholly prevent the creation of alcohol, the proper amount of untreated cereal may be added so that, unfermented, this untreated material will give the desired alcoholic content.

The malt, corn or other cereal, to which we shall hereafter refer simply as cereal, is first moistened and run through a steam heated cylinder wherein its temperature is raised to about 120 degrees F. This step produces a good peptonized state or, in other words, the enzyme peptones are caused to react on the starch to create albumin. The material is then placed in a bin where it is allowed to remain, without the addition of heat, for about half an hour so as to permit the chemical reactions to develop fully. From the bin the material is passed through a cylinder where it is subjected to live steam for a period of from one to five minutes, the material leaving this cylinder at a temperature of about 200 degrees F. During this step the albumin first reaches a maltose state in the neighborhood of 145 degrees F., in which condition it is fermentable. When a temperature of about 190 degrees F. is reached, however, the albumin reaches a dextrin state, where it is no longer fermentable. By raising the temperature rapidly the enzyme diastase is "killed" before it has an opportunity to convert any of or at least not much of the albumin into a maltose state.

The material is then cooled and passed through smooth flaking rolls which crush the same. After being crushed, the material is passed through a jacketed heater and its temperature raised to about 140 degrees F., most of the moisture being driven out during this step. The material is then cooled and thereafter is passed through several driers the first of which has a comparatively low temperature, the temperature increasing throughout the series so that the material leaves the driers at a temperature of about 190 degrees F. This drying step takes about fifteen minutes.

By regulating the temperatures and time intervals, it is possible accurately to control the amount of fermentable matter remaining in the cereal so that the amount of alcohol in the beverage to be made by brewing the prepared cereal will be definitely determined. If desired, the amount of fermentable matter in the prepared cereal may be reduced to zero or to a negligible quantity, and sufficient fermentable material or raw cereal may be added to produce the desired amount of alcohol in the beverage.

The beverage may then be produced in the same way that lager beer is brewed; no addition of sugar or other ingredients being required, and no subsequent distilling being necessary to remove an excess of alcohol.

It will thus be seen that we have produced a novel product by a novel method, whereby a healthful, appetizing, agreeable beverage may be produced, containing any desired amount of alcohol, without wasting any cereal and producing an excess of alcohol, without adding ingredients to check fermentation, without injury to the yeast or to the solids or oils; in fact, without doing anything which would or might make the beverage less satisfactory in any way (except for the reduction in the amount of alcohol) than lager beer. It will furthermore be seen that all of the good qualities of lager beer are retained in a beverage having a low alcohol content, without danger that subsequent fermentation will increase the amount of alcohol.

While we have illustrated in detail what we believe to be the best series of steps for producing our new product, and the temperature limits and time intervals that we have heretofore found to work out best in practice, we do not desire to be limited to the precise details thus disclosed; but intend to cover all products and processes which come within the terms of the definitions of our invention constituting the appended claims.

We claim:

1. A cereal for brewing purposes having its fermentable content converted into a non-fermentable state.

2. The method of preparing a cereal for brewing purposes which consists in subjecting it to moisture and heat of such a temperature as to place it into a good peptonized state, and then quickly heating it to a temperature somewhat below the boiling point of water.

3. The method of preparing a cereal for beverage purposes which consists in subjecting it to moisture and heat of such a temperature as to produce a good peptonized state, and then quickly heating it to a temperature sufficient to produce a dextrin state and kill the enzyme diastase.

4. The method of preparing a cereal for beverage purposes which consists in subjecting it to heat and moisture regulated to produce a good peptonized state, and then heating it to a temperature which will convert it into a dextrin state.

5. The method of preparing a cereal for brewing purposes which consists in wetting it and heating it to a temperature of about 140 degrees F., then storing it for a short time, then raising its temperature rapidly to about 200 degrees F., then cooling it, then crushing it, then heating it to a temperature of about 140 degrees F., then cooling it, and then gradually raising its temperature to about 190 degrees F. to dry it.

In testimony whereof, we sign this specification.

GUSTAV KARL MAYER.
WILLIAM G. ANDREWS.
ALEX VICTOR COLDBY.